(12) United States Patent
Molander et al.

(10) Patent No.: US 9,145,201 B2
(45) Date of Patent: Sep. 29, 2015

(54) METHOD AND SYSTEM FOR STEERING AN UNMANNED AERIAL VEHICLE

(75) Inventors: Sören Molander, Linköping (SE); Mattias Waldo, Linköping (SE); Johan Söderman, Solna (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 14/119,006

(22) PCT Filed: May 26, 2011

(86) PCT No.: PCT/SE2011/050656
§ 371 (c)(1),
(2), (4) Date: Jan. 9, 2014

(87) PCT Pub. No.: WO2012/161630
PCT Pub. Date: Nov. 29, 2012

(65) Prior Publication Data
US 2014/0200744 A1    Jul. 17, 2014

(51) Int. Cl.
*B64C 39/02* (2006.01)
*B64C 19/00* (2006.01)
*G05D 1/10* (2006.01)
*G05D 1/00* (2006.01)

(52) U.S. Cl.
CPC .............. *B64C 19/00* (2013.01); *B64C 39/024* (2013.01); *G05D 1/0094* (2013.01); *G05D 1/101* (2013.01)

(58) Field of Classification Search
CPC ...... G05D 1/101; G05D 1/0094; B64C 19/00; B64C 39/024
USPC .................................................... 701/2
See application file for complete search history.

(56) References Cited

U.S. PATENT DOCUMENTS

2006/0015247 A1* 1/2006 Speer ................... 701/206
2010/0332066 A1   12/2010 Calise

OTHER PUBLICATIONS

International Searching Authority, International Search Report and Written Opinion for International Application No. PCT/SE2011/050656, mailed Feb. 21, 2012, 12 pages, Swedish Patent and Registration Office, Sweden.
International Preliminary Examining Authority, International Preliminary Report on Patentability, including Applicant's Mar. 13, 2013 Response to the Feb. 21, 2012 Written Opinion by the International Searching Authority, for International Application No. PCT/SE2011/050656, mailed Jun. 19, 2013, 15 pages, Swedish Patent and Registration Office, Sweden.

(Continued)

*Primary Examiner* — Mary Cheung
*Assistant Examiner* — Yuen Wong
(74) *Attorney, Agent, or Firm* — Alston & Bird LLP

(57) ABSTRACT

The present invention relates to a method for steering a UAV, Unmanned Aerial Vehicle, to enable a high level command of the UAV. The method comprising the steps of: determining (500) a reference position (200, 300, 400) related to a position (210, 310, 410) for a moving object (220, 320, 420) which the UAV should follow; calculating (515) a smoothed position (230, 330, 430) based on the reference position (200, 300, 400), wherein the smoothed position (230, 330, 430) is calculated so that the smoothed position (230, 330, 430) moves more smoothly than the reference position (200, 300, 400); and steering (525) the UAV so that UAV follows the smoothed position (230, 330, 430).

10 Claims, 4 Drawing Sheets

(56) References Cited

OTHER PUBLICATIONS

Yang, Kwangjin, et al., "Real-Time Continuous Curvature Path Planning of UAVs in Cluttered Environments," In the Proceedings of the 5$^{th}$ International Symposium on Mechatronics and Its Applications (ISMA08), May 27-29, 2008, 6 pages, Jordan.

Lee, Jusuk, et al., "Strategies of Path-Planning for a UAV to Track a Ground Vechicle," In the Proceedings of the Second Annual Symposium on Autonomous Intelligent Networks and Systems, Jun. 30-Jul. 1, 2003, 6 pages, USA.

Dogan, Atilla, et al., "Unmanned Aerial Vehicle Dynamic-Target Pursuit by Using Probalistic Threat Exposure Map," Journal of Guidance, Control, and Dynamics, Jul.-Aug. 2006, pp. 944-954, vol. 29, No. 4, USA.

\* cited by examiner

METHOD AND SYSTEM FOR STEERING AN UNMANNED AERIAL VEHICLE

CROSS REFERENCE TO RELATED APPLICATIONS

This application is a national stage application, filed under 35 U.S.C. §371, of International Application No. PCT/SE2011/050656, filed May 26, 2011, the contents of which are hereby incorporated by reference in its entirety.

BACKGROUND

1. Related Field

The present invention relates to a method for steering a UAV, Unmanned Aerial Vehicle, to enable a high level command of the UAV, and to a system for steering the UAV to enable high level command of the UAV.

2. Description of Related Art

An UAV is an aircraft that is flown by an operator without a human crew on board the aircraft. Their largest uses are in military applications, but are expected to find many civilian applications in the future.

A UAV can fly autonomously or be piloted remotely. Some UAVs is equipped with autonomous guidance systems and automatic control systems which give the UAV the capacity to act as an independent flying vehicle.

UAVs can be equipped with different payloads for information collection and are able to perform tasks such as surveillance, reconnaissance, target acquisition, dissemination of target data and battle damage assessment.

Usually two operators control one UAV. One operator handles the flying commands, and another operator handles the payloads on the UAV. There are also high level commands available which give the operators the ability to give more focus on the mission instead of flying. One example is a high level command that steers the UAV to a specific spatial position. Another example of a high level command is one in which the operator sets up a list of waypoints that the UAV will fly to, starting with the first waypoint in the list and so on. These types of high level commands however still require at least two operators. One operator handles the flying commands and another operator handles the payloads on the UAV.

There is therefore a need for an improved solution for high level command of the UAV that solves or at least mitigates at least one of the above mentioned problems.

BRIEF SUMMARY

An object of the present invention is thus to provide a method and a system for enabling a high level command of the UAV which only requires one operator.

According to a first aspect, the present invention relates to a method for steering a UAV, Unmanned Aerial Vehicle, to enable a high level command of the UAV. The method comprises the steps of: determining a reference position related to a position for a moving object which the UAV should follow; calculating a smoothed position based on the reference position, wherein the smoothed position is calculated so that the smoothed position moves more smoothly than the reference position and steering the UAV so that the UAV follows the smoothed position.

Thus, the object is achieved according to the present invention by determining a reference position related to a position for a moving object which the UAV should follow and calculating a smoothed position based on the reference position. The smoothed position is calculated so that the smoothed position moves more smoothly than the reference position. Thus is a irregular behaviour of the object smoothed out by the present invention. The UAV is steered so that the UAV follows the smoothed position instead of the reference position. In this way the UAV follows the object and at the same time moves more smoothly than the object.

Usually there are two operators needed for the UAV, one for flying and one for payload handling. With the present invention only one operator is needed for the UAV and that operator will be able focus on payload while UAV is doing all the flying part by itself.

A situation where the present invention would be of advantage is convoy following. Along the routes between the bases there may be improvised explosive devices planted by an adversary along and beside the road. By the use of the present invention it would be possible to have the UAV flying at a distance ahead of the convoy and search for threats along and beside the road. Other examples include target following, when keeping a fixed bearing and distance, and positioning of the UAV prior to landing on a moving platform.

According to a second aspect, the present invention relates to a system for steering the UAV to enable high level command of the UAV. The system comprising: a control unit adapted to receive a reference position related to a position for a moving object which the UAV should follow. The control unit being further adapted to calculate a smoothed position based on the reference position, wherein the smoothed position is calculated so that the smoothed position moves more smoothly than the reference position. The system further comprises a steering unit adapted to steer the UAV so that the UAV follows the smoothed position.

An advantage with embodiments of the present invention is that the UAV follows the object and at the same time moves more smoothly than the object.

Yet another advantage with embodiments of the present invention is that the present invention enables a high level command of the UAV which only requires one operator.

BRIEF DESCRIPTION OF THE FIGURES

The invention is described in more detail with reference to enclosed drawings, wherein.

DETAILED DESCRIPTION OF VARIOUS EMBODIMENTS

In the following description, for purposes of explanation and not limitation, specific details are set forth, such as particular sequences of steps, signalling protocols and device configurations in order to provide a thorough understanding of the present invention. It will be apparent to one skilled in the art that the present invention may be carried out in other embodiments that depart from these specific details.

Moreover, those skilled in the art will appreciate that functions and means explained herein below may be implemented using software functioning in conjunction with a programmed microprocessor or general purpose computer, and/ or using an application specific integrated circuit (ASIC). It will also be appreciated that while the current invention is primarily described in the form of methods and arrangements, the invention may also be embodied in a computer program product as well as a system comprising a computer processor and a memory coupled to the processor, wherein the memory is encoded with one or more programs that may perform the functions disclosed herein.

According to the present invention the UAV follows the smoothed position that is placed on a specific distance to the object instead of the (possibly) highly mobile reference position.

Figure 2:
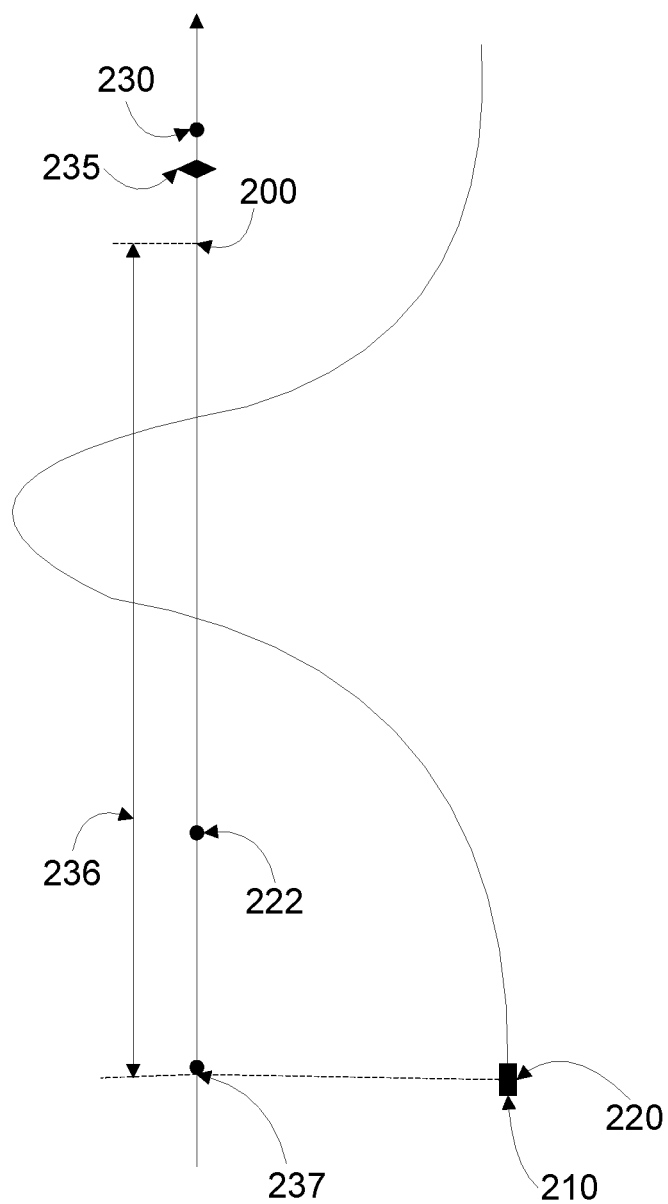
FIG. 2 illustrates a way of determining the reference position from the object position.
Figure 3:
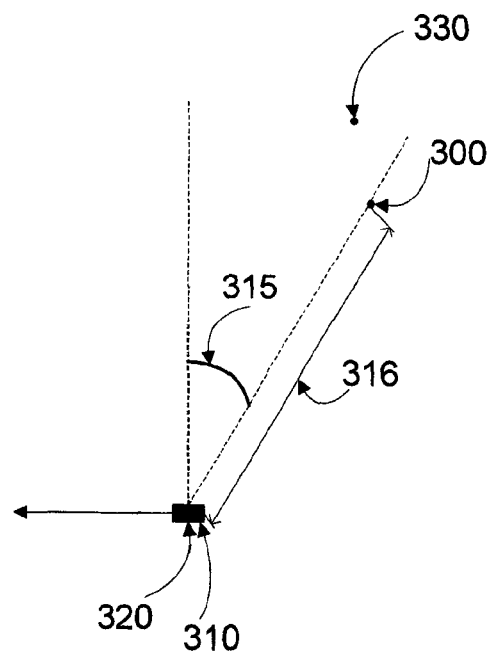
FIG. 3 illustrates a way of determining the reference position from the object position.
Figure 4:
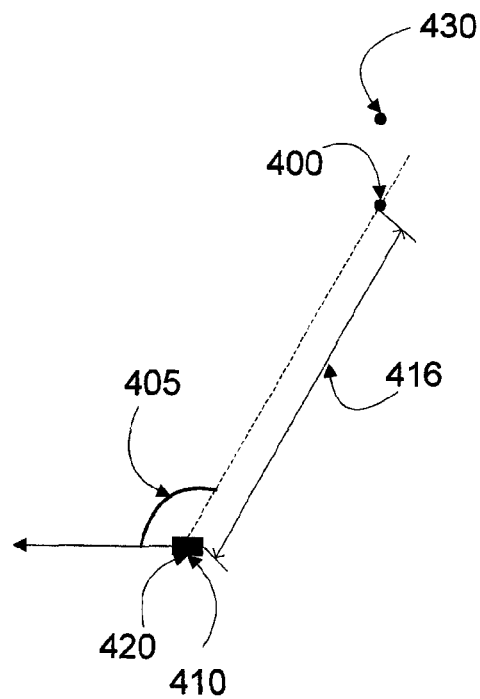
FIG. 4 illustrates a way of determining the reference position from the object position.

FIGS. 2, 3 and 4 illustrates different ways of determining the reference position 200, 300, 400 from the position 210, 310, 410 for the object 220, 320, 420, which the UAV should follow.

FIG. 2 illustrates a way of determining the reference position 200 from the object position 210, where the UAV 235 will follow an arranged piecewise linear route of waypoints 222 and at the same time hold a specific distance to the object 220. The distance to the reference position 200 from the object 220 may be calculated by projecting the objects position 210 on the UAV route 222 and then add a reference distance 236 forward from the projected position 237.

FIG. 3 illustrates another way of determining the reference position 300 from the object position 310, where the UAV will keep a constant reference distance 316 and angle 315 to the object 320. The angle is set with respect to the north axis, but the angle 315 may also be set with respect to other axes.

FIG. 4 illustrates yet another way of determining the reference position 400 from the object position 410, where the UAV holds a specific reference distance 416 and angle 405 to the object 420. It is similar to the way in FIG. 3, the only difference is that the angle 405 is fixed to the moving direction of the object 420.

Figure 1:
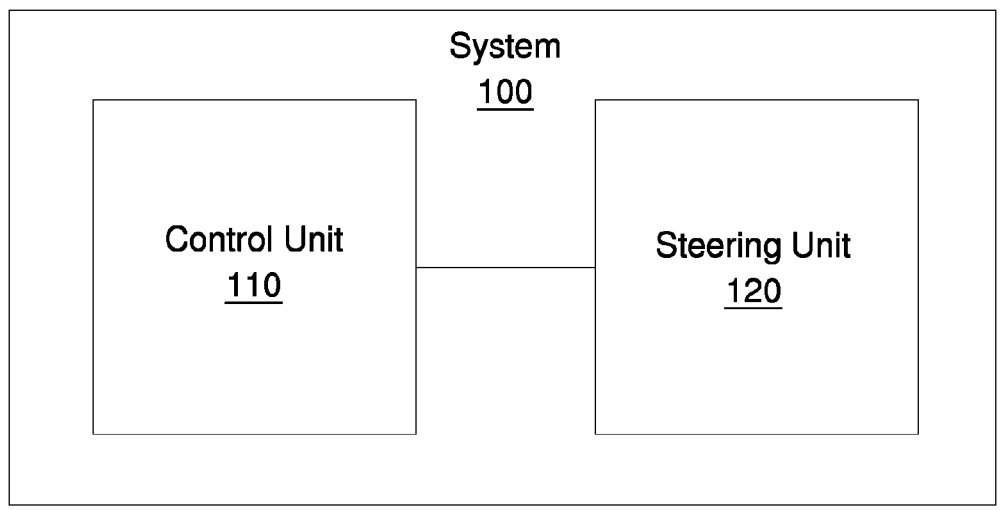
FIG. 1 illustrates a system according to an exemplary embodiment of the present invention.

FIG. 1 shows a system 100 for steering the UAV, to enable high level command of the UAV according to the present invention. The system 100 comprises a control unit 110 adapted to receive the reference position 200, 300, 400 related to a position 210, 310, 410 for the object 220, 320, 420 which the UAV should follow. The control unit 110 is further adapted to calculate a smoothed position 230, 330, 430 based on the reference position 200, 300, 400. The smoothed position 230, 330, 430 is calculated so that the smoothed position 230, 330, 430 moves more smoothly than the reference position 200, 300, 400. In an exemplary embodiment of the system 100 according to the present invention, the control unit 110 is further adapted to regulate the smoothed position 230, 330, 430 to the reference position 200, 300, 400. In yet another exemplary embodiment of the system 100 according to the present invention, the control unit 110 further contains low pass filter functionality (not shown) which smooth out a high frequency behavior of the object 220, 320, 420, thus eliminating high frequency components from the smoothed position 230, 330, 430. In a further exemplary embodiment of the system 100 according to the present invention the control unit 110 is adapted to allow the smoothed position 230, 330, 430 to have a margin of error from the reference position 200, 300, 400. The margin of error may be set by an operator of the system 100. The margin of error is a distance between the smoothed position 230, 330, 430 and the reference position 200, 300, 400.

In a yet further exemplary embodiment of the system 100 according to the present invention, the control unit 110 is further adapted to regulate the smoothed position with less gain when the smoothed position 230, 330, 430 lies within a margin of error from the reference position 200, 300, 400 and with more gain when the smoothed position 230, 330, 430 lies outside the margin of error from the reference position 200, 300, 400.

The reference position 200 may in an exemplary embodiment of the system 100 be determined based on a position 210 for the object 220 being projected on the route of waypoints 222 for the UAV and adding the reference distance 236 in a forward direction of the route of waypoints 222.

The smoothed position 230 will in this embodiment be moving along the UAV route of waypoints 222 and will be regulated towards the reference position 200. The smoothed position 230 has in an exemplary embodiment a regulation with less gain inside the margin of error and a regulation with more gain outside the margin of error to make the smoothed position 230 stay inside the margin of error.

In another exemplary embodiment of the system 100 according to the present invention is the reference position 300 determined based on an angle 315 and a reference distance 316 to the object 320. In this exemplary embodiment is the UAV assumed to follow the object 320 and to keep a specific distance and angle 315 to the object 320. The angle 315 may be set to be constant between the latitude direction (north) and the direction from the UAV to the object 320.

In this exemplary embodiment the smoothed position 330 is moving in a plane and not along a line. Therefore the control unit 110 is adapted to control the smoothed position 330 in two directions, one for each dimension. The smoothed position 330 will be regulated to the reference position 300 and will have a margin of error to the reference position 300 were regulation is performed with less gain. This margin of error may be a circle but may also be in other shapes. In an exemplary embodiment the control unit 110 is adapted to regulate the smoothed position 330 such that the smoothed position 330 will never be outside the margin of error.

In another exemplary embodiment of the system 100 according to the present invention is the reference position 400 determined based on an angle 405 to a moving direction for the object 420 and a reference distance 416 to the object 420.

The system 100 further comprising a steering unit 120 adapted to steer the UAV so that the UAV follows the smoothed position 230, 330, 430.

Figure 5:
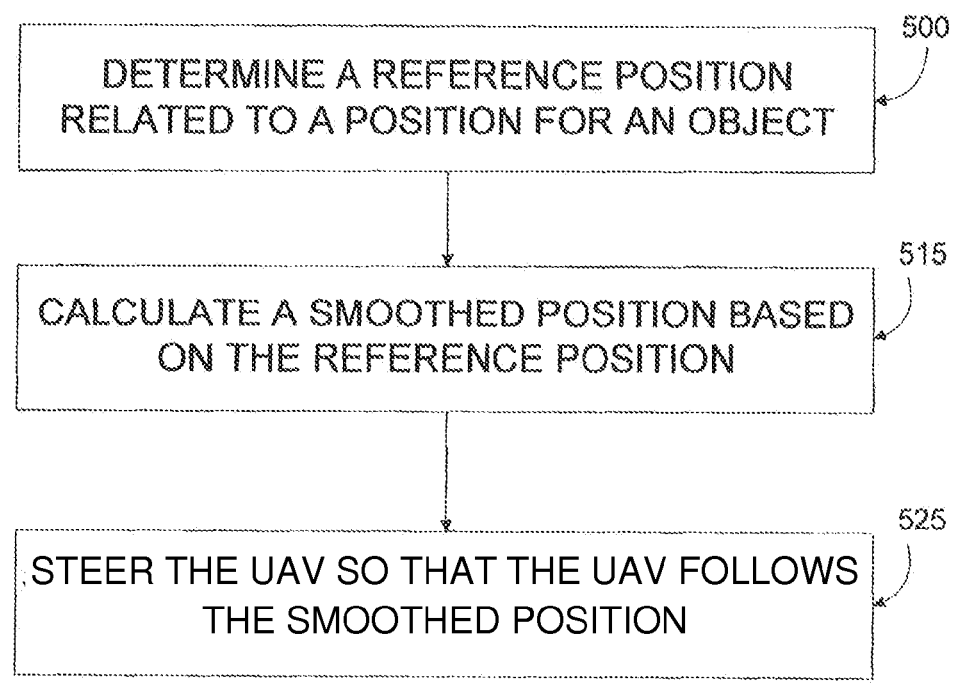
FIG. 5 illustrates a flow chart of a method according to an exemplary embodiment of the present invention.

Referring to FIG. 5 there is illustrated a flowchart of a method describing the steps for steering the UAV to enable a high level command of said UAV, in accordance with previously described embodiments of the present invention. As shown in FIG. 5, the method comprises:

500 determining a reference position 200, 300, 400 related to a position 210, 310, 410 for a moving object 220, 320, 420 which the UAV should follow;

515 calculating a smoothed position 230, 330, 430 based on the reference position 200, 300, 400, wherein the smoothed position 230, 330, 430 is calculated so that the smoothed position 230, 330, 430 moves more smoothly than the reference position 200, 300, 400;

525 steering the UAV so that the UAV follows the smoothed position 230, 330, 430.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for steering an Unmanned Aerial Vehicle (UAV), the method comprising the steps of:
   determining (500) a reference position (200, 300, 400) related to a position (210, 310, 410) for an object (220, 320, 420) which said UAV shall follow;
   calculating (515), with a processor with a low pass filter functionality, a smoothed position (230, 330, 430) based on said reference position (200, 300, 400) wherein said calculation comprises a regulation of said smoothed position (230, 330, 430) towards said reference position (200, 300, 400) so that said smoothed position (230, 330, 430) has less position variation as compared to a position variation of said reference position (200, 300, 400); and
   steering (525) said UAV so that said UAV follows said smoothed position (230, 330, 430).

2. The method according to claim 1, wherein said regulation has less gain when said smoothed position (230, 330, 430) lies within a margin of error from said reference position (200, 300, 400) and more gain when said smoothed position (230, 330, 430) lies outside said margin of error from said reference position (200, 300, 400).

3. The method according to claim 1, wherein said reference position (200, 300, 400) is determined based on an angle and a distance to said object.

4. The method according to claim 1, wherein said reference position (200, 300, 400) is determined based on an angle to a moving direction for said object and a distance to said object.

5. The method according to claim 1, wherein said reference position (200, 300, 400) is determined based on a position for said object being projected on a track for said UAV and adding a distance in a forward direction of said track.

6. A system (100) for steering an Unmanned Aerial Vehicle (UAV), the system comprising:
   a processor with a low pass filter functionality, configured to receive a reference position (200, 300, 400) related to a position (210, 310, 410) for an object (220, 320, 420) which said UAV shall follow, said processor with said low pass filter functionality being further configured to calculate a smoothed position (230, 330, 430) based on said reference position (200, 300, 400); and
   a steering unit (120),
   wherein said calculation of said smoothed position (230, 330, 430) comprises a regulation of said smoothed position (230, 330, 430) towards said reference position (200, 300, 400), so that said smoothed position (230, 330, 430) has less position variation as compared to a position variation of said reference position (200, 300, 400) so that said UAV follows said smoothed position (230, 330, 430) when steered by said steering unit (120).

7. The system (100) according to claim 6, wherein said processor with said low pass filter functionality is further configured to regulate said smoothed position with less gain when said smoothed position (230, 330, 430) lies within a margin of error from said reference position (200, 300, 400) and more gain when said smoothed position (230, 330, 430) lies outside said margin of error from said reference position (200, 300, 400).

8. The system (100) according to claim 6, wherein said reference position (200, 300, 400) is determined based on an angle and a distance to said object.

9. The system (100) according to claim 6, wherein said reference position (200, 300, 400) is determined based on an angle to a moving direction for said object and a distance to said object.

10. The system according to claim 6, wherein said reference position (200, 300, 400) is determined based on a position for said object being projected on a track for said UAV and adding a distance in a forward direction of said track.

* * * * *